United States Patent
Zee et al.

(10) Patent No.: US 11,102,842 B2
(45) Date of Patent: Aug. 24, 2021

(54) METHODS, WIRELESS DEVICE, NETWORK NODE AND CORE NODE FOR MANAGING REACHABILITY OF THE WIRELESS DEVICE

(71) Applicant: TELEFONAKTIEBOLAGET LM ERICSSON (PUBL), Stockholm (SE)

(72) Inventors: Oscar Zee, Stockholm (SE); Alexander Vesely, Feldbach (AT); Angelo Centonza, Stockholm (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/749,837

(22) PCT Filed: Dec. 13, 2017

(86) PCT No.: PCT/SE2017/051262
§ 371 (c)(1),
(2) Date: Feb. 2, 2018

(87) PCT Pub. No.: WO2018/117945
PCT Pub. Date: Jun. 28, 2018

(65) Prior Publication Data
US 2019/0007995 A1    Jan. 3, 2019

Related U.S. Application Data

(60) Provisional application No. 62/436,482, filed on Dec. 20, 2016.

(51) Int. Cl.
*H04W 76/38* (2018.01)
*H04W 76/27* (2018.01)
*H04W 76/28* (2018.01)

(52) U.S. Cl.
CPC .......... *H04W 76/38* (2018.02); *H04W 76/27* (2018.02); *H04W 76/28* (2018.02)

(58) Field of Classification Search
CPC .............................. H04W 76/27; H04W 76/19
See application file for complete search history.

(56) References Cited

U.S. PATENT DOCUMENTS 10,206,091 B2   2/2019   Ryu et al.
2015/0146599 A1*   5/2015   Jha .................. H04L 5/0032
                                           370/311

(Continued)

FOREIGN PATENT DOCUMENTS

EP        2487954 A2    8/2012
WO   2016024789 A1    2/2016

OTHER PUBLICATIONS

3GPP TS 23.060 V14.2.0; Technical Specification Group Services and System Aspects; General Packet Radio Service (GPRS); Service description; Stage 2 (Release 14).

(Continued)

*Primary Examiner* — Hassan Kizou
*Assistant Examiner* — Hector Reyes
(74) *Attorney, Agent, or Firm* — Patent Portfolio Builders PLLC

(57) ABSTRACT

A wireless device, a network node, a core node and methods therein, for managing reachability of the wireless device. The wireless device starts an AS (Access Stratum) reachable timer when entering an inactive state. If the AS reachable timer expires while still in the inactive state, the wireless device sends to the network node a reachable notification indicating that the wireless device is reachable. If entering a connected state before the AS reachable timer expires, the wireless device stops the AS reachable timer when changing from the inactive state to a connected state. If the core node receives from the network node a not reachable notification (Continued)

indicating that the wireless device is not reachable, the wireless device can be marked as not reachable via paging.

19 Claims, 9 Drawing Sheets

(56) References Cited

U.S. PATENT DOCUMENTS

| | | | |
|---|---|---|---|
| 2015/0223198 A1 | 8/2015 | Du et al. | |
| 2016/0057795 A1* | 2/2016 | Kim | H04W 76/14 370/329 |
| 2016/0073338 A1* | 3/2016 | Kim | H04W 52/02 370/311 |
| 2018/0007730 A1* | 1/2018 | Fujishiro | H04W 16/32 |
| 2018/0139778 A1* | 5/2018 | Chou | H04W 76/27 |
| 2019/0021064 A1* | 1/2019 | Ryu | H04W 76/27 |
| 2019/0021134 A1* | 1/2019 | Zhang | H04W 76/27 |
| 2019/0174480 A1* | 6/2019 | Wong | H04W 72/042 |
| 2019/0215800 A1* | 7/2019 | Fujishiro | H04W 52/02 |

OTHER PUBLICATIONS

3GPP TS 24301 V14.2.0; Technical Specification Group Core Network and Terminals; Non-Access-Stratum (NAS) protocol for Evolved Packet System (EPS); Stage 3 (Release 14).
Office Action in Taiwan Application No. 106144614 completed Dec. 17, 2018.
Ericsson; "Handling of inactive UEs"; 3GPP TSG-RAN WG3 #91bis, R3-160845, Apr. 11-15, 2016; 4 pages.
International Search Report in International Application No. PCT/SE2017/051262 dated Mar. 7, 2018.
Written Opinion of the International Searching Authority in International Application No. PCT/SE2017/051262 dated Mar. 7, 2018.

* cited by examiner

METHODS, WIRELESS DEVICE, NETWORK NODE AND CORE NODE FOR MANAGING REACHABILITY OF THE WIRELESS DEVICE

TECHNICAL FIELD

The present disclosure relates generally to a wireless device, a network node, a core node, and methods therein, for managing reachability of the wireless device.

BACKGROUND

In this disclosure, the term "wireless device" is sometimes used to represent any communication entity capable of radio communication with a radio network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device. The terms wireless device and UE are thus used interchangeably herein.

Further, the term "network node", is used herein to represent any node of a radio access network, RAN, that is operative to communicate radio signals with wireless devices. The network node in this disclosure may refer to a base station, radio node, evolved Node B, base transceiver station, access point, etc., which communicates radio signals with the wireless device. The term "eNB" is frequently used herein to represent the network node described herein. The terms network node and eNB are thus used interchangeably herein.

Further, the term "core node", is used herein to represent any node of a core network, CN, that is operative to provide communication with wireless devices. The core node in this disclosure is associated with the RAN. The term Mobility Management Entity, "MME" is frequently used herein to represent the core node. The terms core node and MME are thus used interchangeably herein.

FIG. 1 illustrates a communication scenario where a wireless device 100 can communicate with a network node 102 of a RAN over a wireless RRC interface.

The network node 102 can further communicate with a core node 104 of a core network over an S1 interface. This communication scenario may be applicable to the examples, situations and embodiments described herein.

However, it is a problem that the network, e.g. the core node 104 and network node 102, may not be aware of whether the wireless device 100 currently can be reached or not, referred to as reachability, such as whether the wireless device 100 is able to receive paging messages or the like. Solutions of today for reaching a wireless device require substantial signaling which consumes resources in the network and causes unwanted delays, particularly in paging procedures.

SUMMARY

It is an object of embodiments described herein to address at least some of the problems and issues outlined above. It is possible to achieve this object and others by using a wireless device, a network node, a core node, and methods therein, as defined in the attached independent claims.

According to one aspect, a method is performed by a wireless device for managing reachability of the wireless device, wherein the wireless device is in ECM_CONNECTED state and has an ECM connection between a network node of a RAN (Radio Access Network) and a core node associated with the RAN. In this method the wireless device starts an AS (Access Stratum) reachable timer when entering an inactive state. When detecting in the inactive state that the AS reachable timer expires, the wireless device sends to the network node a reachable notification indicating that the wireless device is reachable. Alternatively, when changing from the inactive state to a connected state before the AS reachable timer expires, the wireless device stops the AS reachable timer.

According to another aspect, a wireless device is arranged to manage reachability of the wireless device, where the wireless device is in ECM_CONNECTED state and has an ECM connection between a network node of a RAN and a core node associated with the RAN. The wireless device is configured to start an AS reachable timer when entering an inactive state, and to send to the network node a reachable notification indicating that the wireless device is reachable when detecting in the inactive state that the AS reachable timer expires, or stop the AS reachable timer when changing from the inactive state to a connected state before the AS reachable timer expires.

According to another aspect, a method is performed by a network node of a RAN, for managing reachability of a wireless device, wherein the wireless device is in ECM_CONNECTED state and has an ECM connection between the network node and a core node associated with the RAN. In this method, the network node detects that the wireless device enters an inactive state and starts an AS reachable timer. When receiving from the wireless device a reachable notification indicating that the wireless device is reachable, the network node restarts the AS reachable timer, or when detecting that the wireless device has changed from the inactive state to a connected state, the network node stops the AS reachable timer, or when detecting that the AS detach timer expires the network node starts an AS detach timer and disconnecting the ECM connection between the network node and the core node.

According to another aspect, a network node of a RAN is arranged to manage reachability of a wireless device, where the wireless device is in ECM_CONNECTED state and has an ECM connection between the network node and a core node associated with the RAN. The network node is configured to detect that the wireless device enters an inactive state, and to start an AS reachable timer. The network node is further configured to restart the AS reachable timer when receiving from the wireless device a reachable notification indicating that the wireless device is reachable, or stop the AS reachable timer when detecting that the wireless device has changed from the inactive state to a connected state, or start an AS detach timer and disconnecting the ECM connection between the network node and the core node when detecting that the AS detach timer expires.

According to another aspect, a method is performed by a core node associated with a RAN, for managing reachability of a wireless device, wherein the wireless device is in ECM_CONNECTED state and has an ECM connection between a network node of the RAN and the core node. In this method, the core node receives from the network node a not reachable notification indicating that the wireless device is not reachable, wherein the wireless device can be marked as not reachable via paging.

According to another aspect, a core node associated with a RAN is arranged to manage reachability of a wireless device, wherein the wireless device is in ECM_CONNECTED state and has an ECM connection between a network node of the RAN and the core node. The core node is configured to receive from the network node a not reachable notification indicating that the wireless device is not reachable, wherein the wireless device can be marked as not reachable via paging.

The above wireless device, network node, core node and methods may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

The third generation partnership project (3GPP) is currently working on standardization of Release 13 of the Long Term Evolution (LTE) concept. The architecture of the LTE system includes radio access nodes (eNBs, Home eNBs—HeNBs, HeNB GW) and evolved packet core nodes (MME/S-GW). In the LTE architecture, an S1 interface connects HeNBs/eNBs to the MME/S-GW and HeNBs to the HeNB GW, while an X2 interface connects peer eNBs/HeNBs, optionally via an X2 GW.

Figure 2:
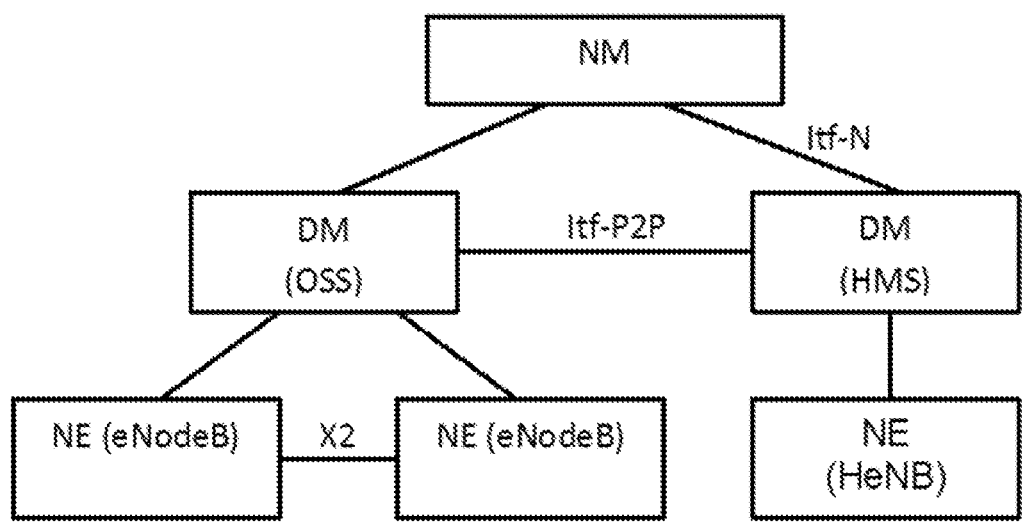
FIG. 2 is an example of a management system for node elements NEs, e.g. base stations, which are managed by domain managers DMs further managed by a network manager NM, where the solution may be employed.

A management system that may be used when employing the procedures described herein is shown in FIG. 2. The node elements (NE), also referred to as eNodeB, are managed by a domain manager (DM), also referred to as operation and support system (OSS). A DM may further be managed by a network manager (NM). Two NEs are interfaced by X2, whereas the interface between two DMs is referred to as Itf-P2P. The management system may configure the network elements, as well as receive observations associated to features in the network elements. For example, DM observes and configures NEs, while NM observes and configures DM, as well as NE via DM.

By means of configuration via the DM, NM and related interfaces, functions over the X2 and S1 interfaces can be carried out in a coordinated way throughout the RAN, eventually involving the Core Network, i.e. MME and S-GWs.

Details on UE reachability management in ECM-IDLE can be found in 3GPP TS 23.401. A brief summary is described below.

As UE entered ECM-IDLE state, its location is known by the network on a Tracking Area List granularity. All cells of the Tracking Areas in which a UE in ECM-IDLE/EMM-REGISTERED is currently registered needs to be taken into account for paging. However, UE also needs to notify the network its availability periodically. Therefore, a periodic Tracking Area Update, TAU, timer (T3412) is used by UE performing periodic Tracking Area Updates with the network after the expiry of the timer.

The MME may allocate long periodic TAU timer value to the UE. Typically, this periodic TAU timer value is sent in ATTACH ACCEPT and/or TRACKING AREA UPDATE ACCEPT messages.

If the UE is out of E-UTRAN coverage when its periodic TAU timer expires, the UE shall:
  if ISR (Idle Mode Signalling Reduction) is activated, start the E-UTRAN Deactivate ISR timer. After the E-UTRAN Deactivate ISR timer expires the UE shall deactivate ISR.
  when EMM-REGISTERED, perform a Tracking Area Update when it next returns to E UTRAN coverage.

The E-UTRAN Deactivate ISR timer is stopped when the UE performs a successful Tracking Area Update.

The UE's periodic TAU timer is restarted from its initial value whenever the UE enters ECM IDLE mode.

Typically, the MME runs a mobile reachable timer. Whenever the UE enters ECM IDLE mode the timer is started with a value similar to the UE's periodic TAU timer. If this timer expires in the MME, the MME can deduce that the UE is not reachable. However, the MME does not know for how long the UE is not reachable, so, the MME shall not immediately delete the UE's bearers. Instead the MME should clear the PPF (Page Proceed Flag) in the MME and start an Implicit Detach timer, with a relatively large value and if ISR is activated, at least slightly larger than the UE's E-UTRAN Deactivate ISR timer.

If MME has allocated an Active Time to the UE, then the MME starts the Active timer with the value of Active Time whenever the UE enters ECM IDLE mode. If this timer expires in the MME, the MME can deduce that the UE is not reachable and should clear the PPF in the MME.

With the PPF cleared, the MME does not page the UE in E UTRAN coverage and shall send a Downlink Data Notification Reject message to the Serving GW when receiving a Downlink Data Notification message from the Serving GW. If the Implicit Detach timer expires before the UE contacts the network, then the MME can deduce that the UE has been 'out of coverage' for a long period of time and implicitly detach the UE.

LTE Architecture Evolution

It is not yet specified by 3GPP if and how the LTE architecture should evolve to meet the challenges of the 5G time frame.

It may however be assumed that there will be evolved counterparts of the S1, X2 and Uu interfaces and that any new Radio Access Technology, RAT would be integrated with the LTE radio interface at RAN level in a similar fashion as the way LTE Dual Connectivity is defined.

The embodiments and examples described herein may be useful for both an LTE-like architecture and a new architecture based on an evolution of the S1 interface, also referred to as an S1 connection.

RRC Suspension and Inactive State

In 3GPP document R3-160845, there is a description on RRC suspension principle.

In current Evolved Packet System, EPS networks, the main contributors to the signalling overhead and load are procedures used for UE state transition, i.e. at transition between the Idle and the connected states.

Figure 3:
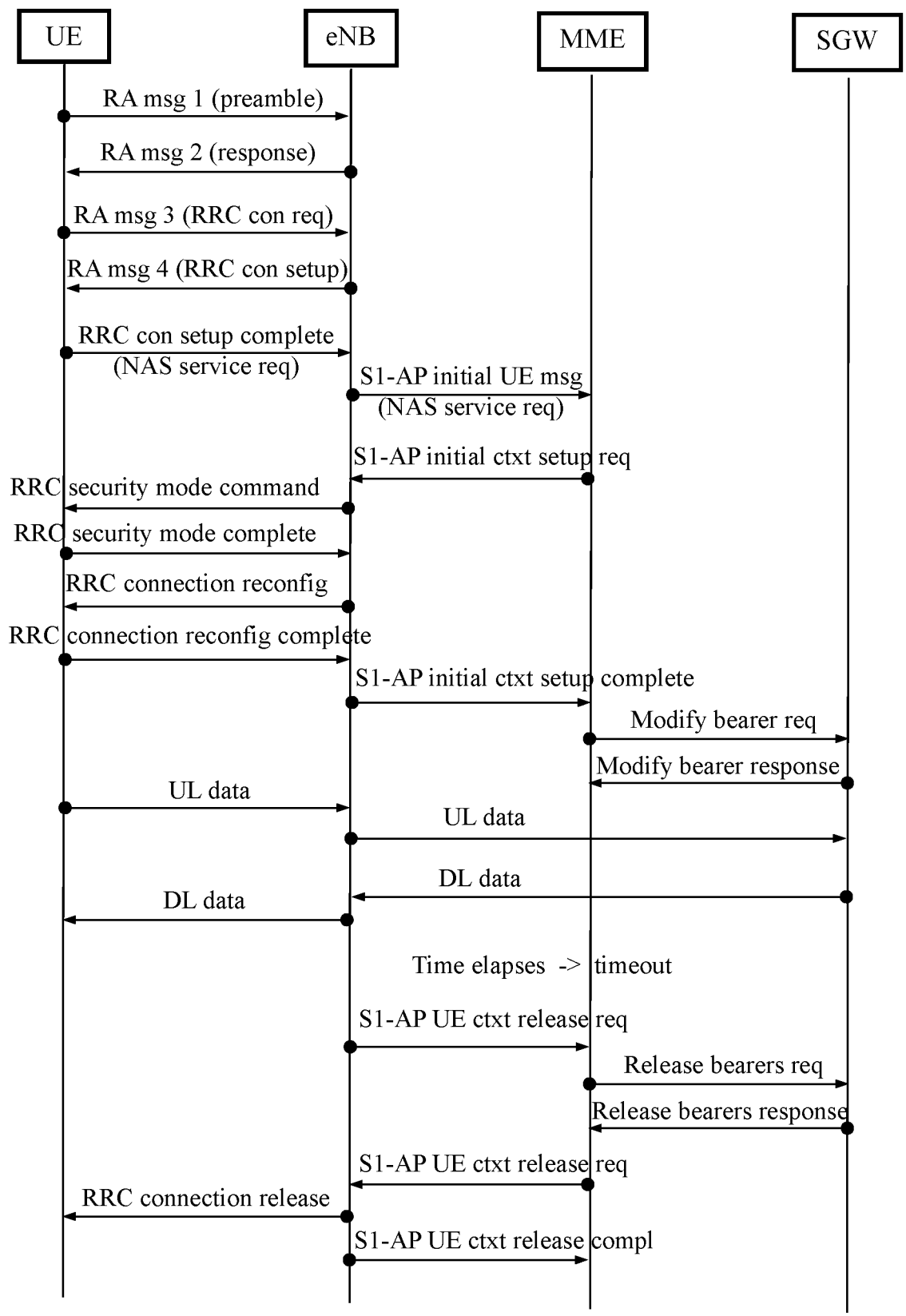
FIG. 3 is a signaling diagram illustrating a current signaling procedure required to establish and tear down a connection between a UE and an eNB, according to the prior art.

FIG. 3 illustrates the current S1/EPS architecture based procedures required to establish and tear down a connection in order for the UE to be able to transfer/receive user plane data, i.e. procedures applicable at UE idle/connected state transition. As it can be seen in this figure, there is a significant amount of signalling overhead on the Uu (radio) and S1 interfaces required for small data transactions.

In order to reduce the signalling overhead and the associated processing load in the network, it has been proposed that a solution will be introduced in Rel-13 that allows an RRC connection to be suspended and at a later time resumed; minimising the need to go through the full signalling procedure for setting up a new RRC connection upon idle to connected state transition. The proposed solution is applicable both to LTE UEs and IoT (Internet of Things) UEs.

Figure 4:
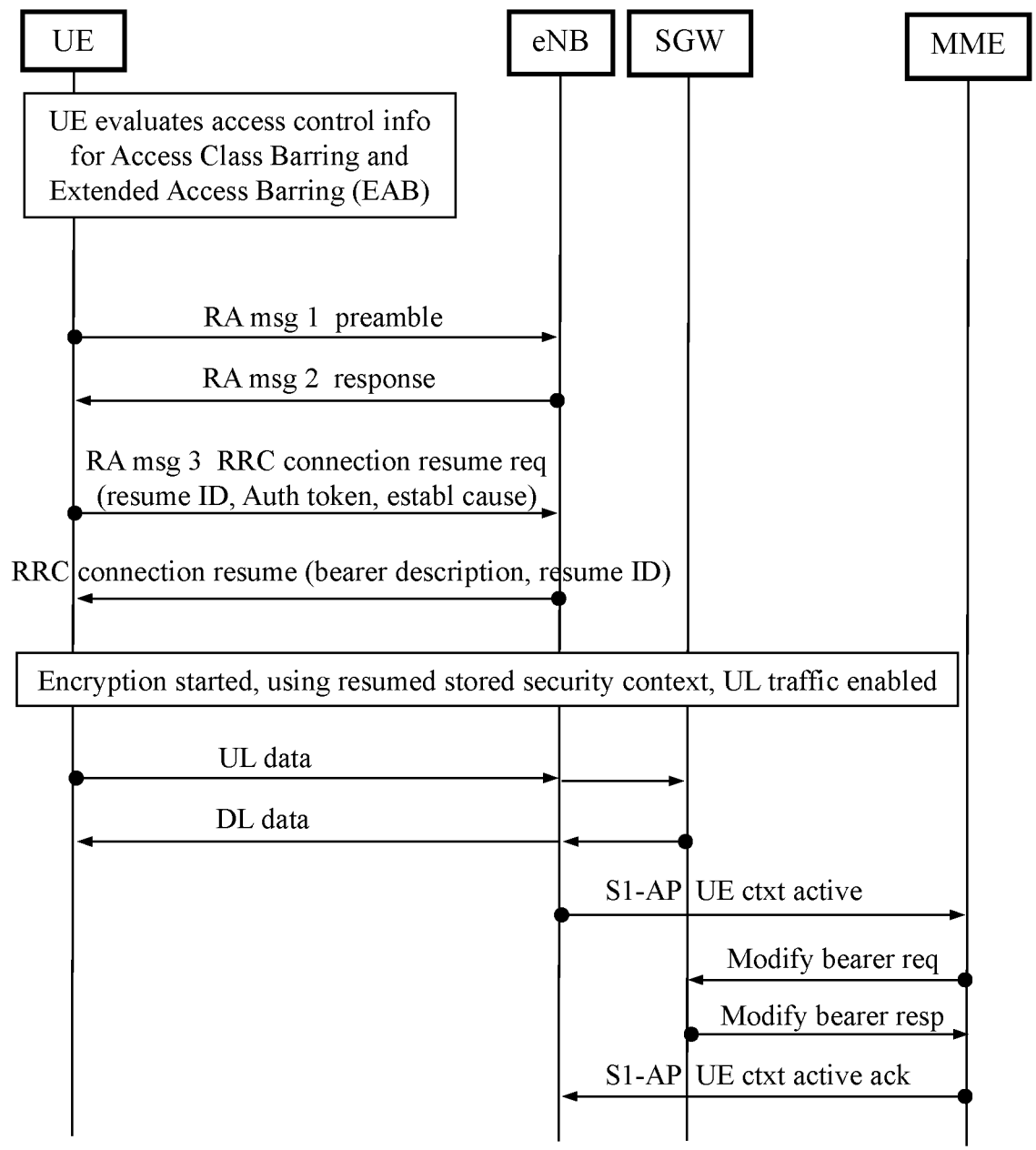
FIG. 4 is another signaling diagram illustrating a signaling procedure for a UE and an eNB with enhancements enabling the UE to resume an RRC connection when returning from IDLE state, according to the prior art.

The proposed and adopted solution is based on enhancements to the IDLE state to make it possible to resume the RRC connection avoiding the need to set it up again when the UE returns from IDLE, assuming that most of the times the UE returns in a node which has the stored RRC context. The procedure is illustrated in FIG. 4.

In the discussions on 5G system design, an evolution of the suspend/resume technique has been proposed and is currently under evaluation. This proposal includes creating a new UE state, herein called Inactive State. This state is sometimes called dormant state or dormant mode or inactive mode. This state includes keeping the UE in RRC_IDLE, while a Control Plane (CP) and User Plane (UP) signaling connection between RAN and CN is kept active for the UE. Therefore the UE appears as Connected/active from a CN point of view but it is Idle from an Access Stratum (AS) point of view. With this new state it has not been specified how reachability of the UE is achieved. As an example, it may therefore not be possible for the core node to know whether the UE is reachable for paging.

Some problems with existing solutions may be as follows.

As RRC Inactive State is introduced, there will be no guarantee that the UE is reachable by RAN (or by the Core Network) when there is no dedicated RRC connection in between, also when the RRC connection is suspended, and the ECM is still in ECM_CONNECTED state. Therefore there is a problem of activation of UE reachability management mechanisms because in legacy systems a UE that is in ECM_CONNECTED at the CN is not supposed to perform any reachability updates. Therefore, additional mechanisms for UE reachability management are needed.

In UTRAN, one solution to solve this problem is introducing a timer on transition from URA_PCH state (similar to RRC suspended) to IDLE state. However, by introducing a similar solution the signaling overhead will increase on the Uu (radio) and S1 interfaces, which is contrary to the objective of reducing the signaling by RRC suspension and Inactive State.

The above problems may be addressed by employing at least some of the embodiments herein, as follows.

Figure 1:
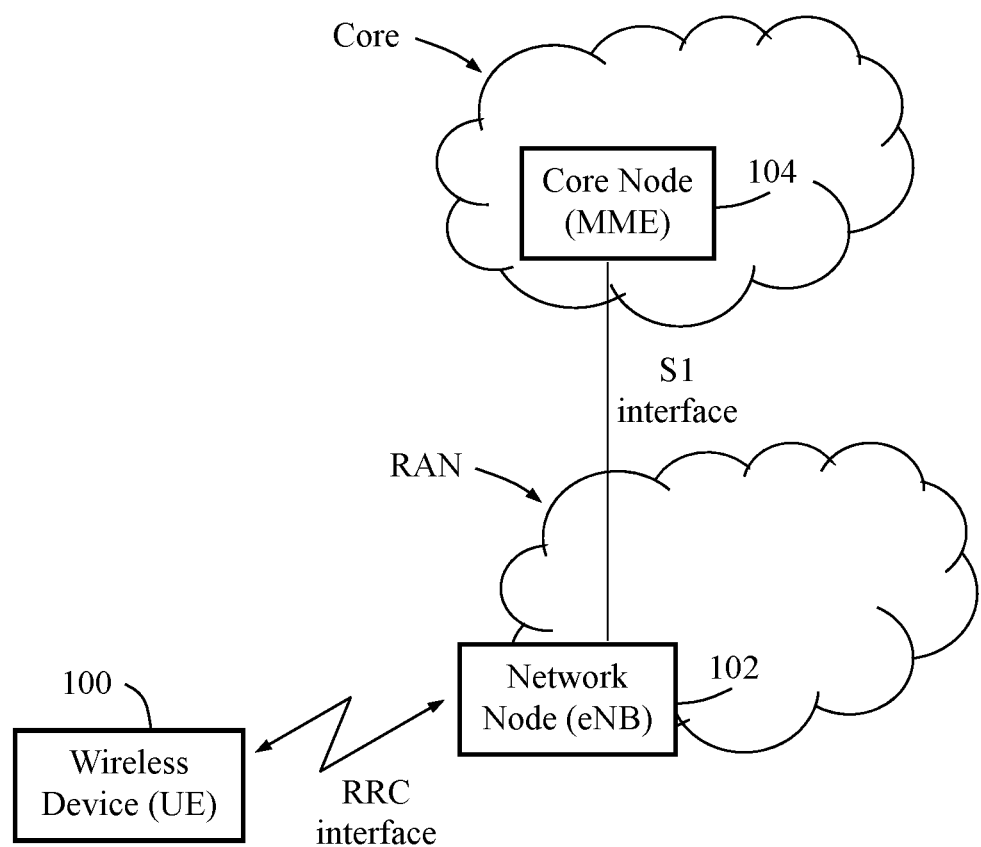
FIG. 1 is a communication scenario illustrating a wireless device communicating with a network node over a wireless RRC interface and the network node communicating with a core node over an S1 interface, where the solution may be employed.
Figure 5:
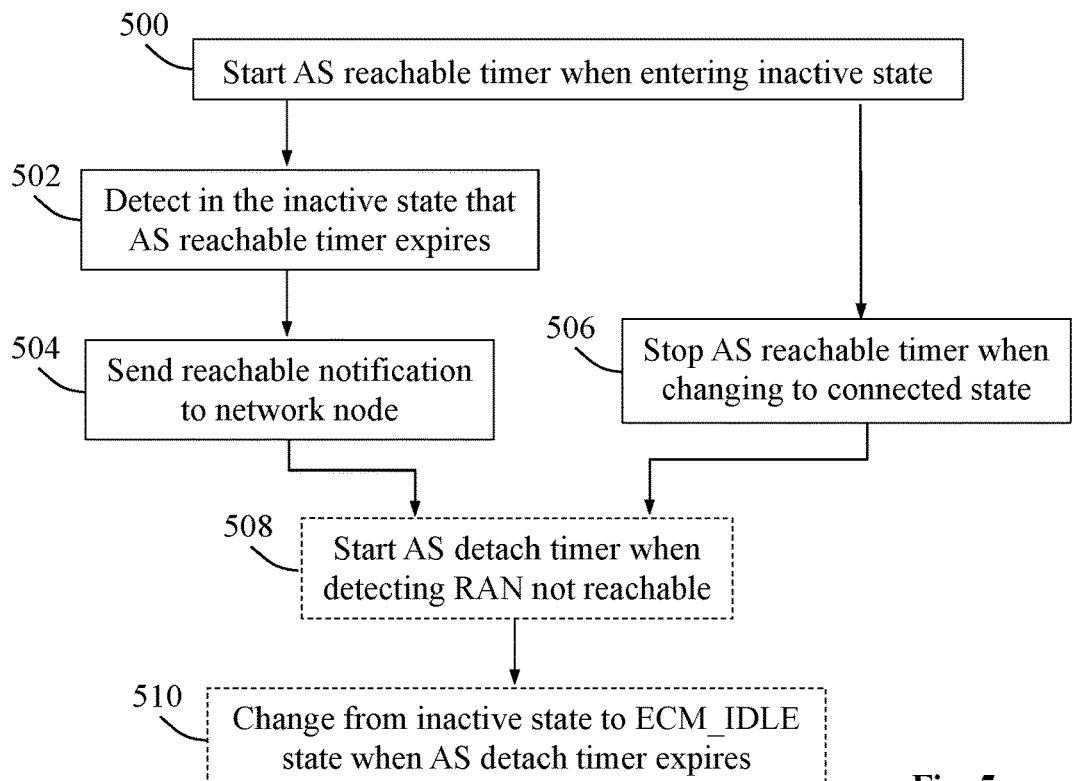
FIG. 5 is a flow chart illustrating a procedure in a wireless device, according to some example embodiments.

An example of how the solution may be employed in terms of actions performed by a wireless device such as the wireless device 100, will now be described with reference to the flow chart in FIG. 5, and with further reference to FIG. 1 as a non-limiting example. FIG. 5 thus illustrates a procedure in the wireless device 100 for managing reachability of the wireless device 100, wherein the wireless device 100 is in ECM_CONNECTED state and has an ECM connection between a network node 102 of a RAN (Radio Access Network) and a core node 104 associated with the RAN.

In a first action 500, the wireless device 100 starts an AS (Access Stratum) reachable timer when entering an inactive state. Depending on the AS reachable timer and in which state the device is, either of the following is performed. If the wireless device 100 detects in an action 502 that the AS reachable timer expires while still in the inactive state, another action 504 illustrates that the wireless device 100 sends to the network node 102 a reachable notification indicating that the wireless device 100 is reachable.

As an alternative to actions 502 and 504, the wireless device 100 enters a connected state before the AS reachable timer expires, and another action 506 illustrates that the wireless device 100 in this case stops the AS reachable timer when changing from the inactive state to a connected state before the AS reachable timer expires.

Some example embodiments that could be used in this procedure will now be described. In one example embodiment, the wireless device 100 may receive a value of the AS reachable timer from the network node 102. Alternatively, this value may have been preconfigured in the wireless device 100.

In some example embodiments, the wireless device 100 may restart the AS reachable timer after sending said reachable notification to the network node 102 as of action 504, and also after receiving a reachable notification acknowledgement from the network node 102, or when changing from the connected state to the inactive state.

In another example embodiment, the wireless device 100 may, after either of actions 504 and 506, start an AS (Access Stratum) detach timer when detecting that the RAN is not reachable when the AS reachable timer expires, as illustrated by an optional action 508. the wireless device 100 may further change from the inactive state to ECM_IDLE state when detecting that the AS detach timer expires, as illustrated by another optional action 510. In another example embodiment, the wireless device 100 may receive a value of the AS detach timer from the network node 102. Alternatively, this value may have been preconfigured in the wireless device 100.

Figure 6:
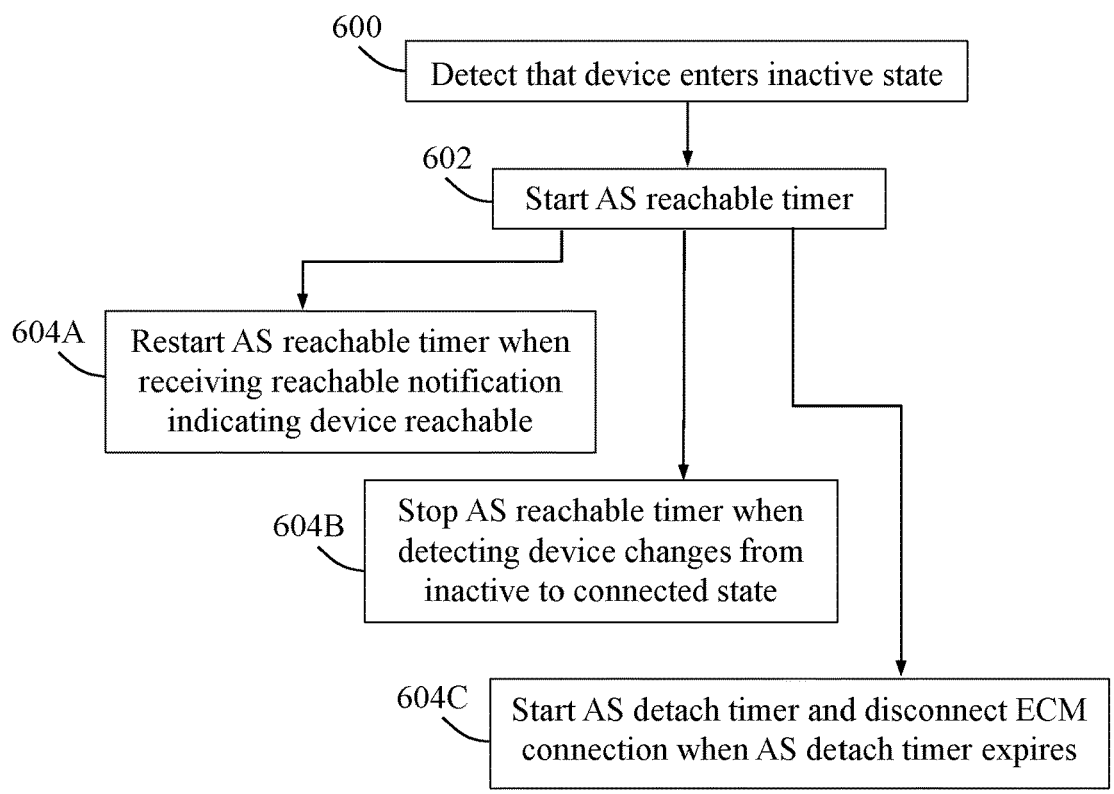
FIG. 6 is a flow chart illustrating a procedure in a network node, according to further example embodiments.

An example of how the solution may be employed in terms of actions performed by a network node such as the network node 102, will now be described with reference to the flow chart in FIG. 6, and with further reference to FIG. 1. FIG. 6 thus illustrates a procedure in a network node 102 of a RAN (Radio Access Network), for managing reachability of a wireless device 100, wherein the wireless device 100 is in ECM_CONNECTED state and has an ECM connection between the network node 102 and a core node 104 associated with the RAN.

In a first action 600, the network node 102 detects that the wireless device 100 enters an inactive state. This triggers the network node 102 to start an AS (Access Stratum) reachable timer in another action 602 which corresponds to action 500 above. It should be noted that the ECM connection between the network node 102 and the core node 104 can be maintained and handled for the wireless device 100 as follows. Depending on what happens next, the network node 102 will perform either of the following alternative actions.

In one alternative action 604A, the network node 102 restarts the AS reachable timer when receiving from the wireless device 100 a reachable notification indicating that the wireless device 100 is reachable. Thereby, the still existing ECM connection is maintained and can be used for the wireless device 100 in case it enters the connected state.

In another alternative action 604B, the network node 102 stops the AS reachable timer when detecting that the wireless device 100 has changed from the inactive state to a connected state. Thereby, the existing ECM connection can be used for the wireless device 100 and it is not necessary to set up a new ECM connection.

In another alternative action 604C, the network node 102 starts an AS (Access Stratum) detach timer and disconnects the ECM connection between the network node 102 and the core node 104 when detecting that the AS detach timer expires. The AS detach timer in this case thus controls how long time the ECM connection between the network node 102 and a core node 104 is maintained for the wireless device 100.

An example of how the solution may be employed in a procedure performed by a core node associated with a RAN, such as the core node 104, will now also be described. This procedure is thus performed by the core node 104 for managing reachability of a wireless device 100, wherein the wireless device 100 is in ECM_CONNECTED state and has an ECM connection between a network node 102 of the RAN and the core node 104.

In this procedure, the core node 104 receives from the network node 102 a not reachable notification indicating that the wireless device 100 is not reachable, wherein the wireless device 100 can be marked as not reachable via paging. Marking, or noting, the wireless device 100 as not reachable may be done in different ways.

In one example embodiment, the core node 104 may mark the wireless device 100 as not reachable via paging, by clearing a PPF (Page Proceed Flag) of the wireless device 100.

Figure 7:
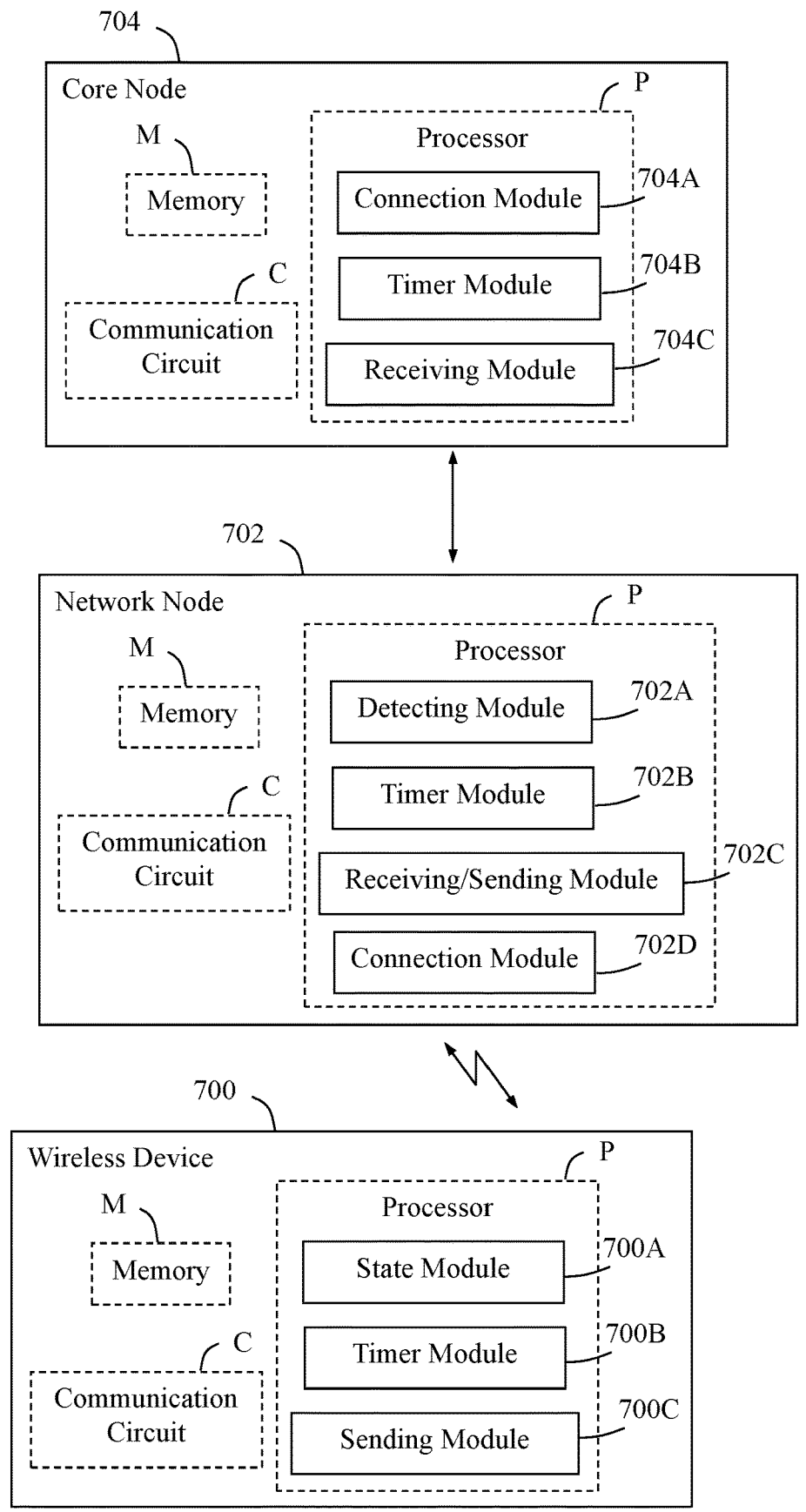
FIG. 7 is a block diagram illustrating how a wireless device, a network node and a core node may be structured, according to further example embodiments.

The block diagram in FIG. 7 illustrates a detailed but non-limiting example of how a wireless device 700, a network node 702 and a core node 704, respectively, may be structured to bring about the above-described alternatives and embodiments thereof. In this figure, the wireless device 700, the network node 702 and the core node 704 may be configured to operate according to any of the alternatives and examples of employing the solution as described herein, where appropriate. Each of the wireless device 700, the network node 702 and the core node 704 is shown to comprise a processor "P", a memory "M" and a communication circuit "C" with suitable equipment for transmitting and receiving messages and signals in the manner described herein.

The communication circuit C in each of the wireless device 700, the network node 702 and the core node 704 thus comprises equipment configured for communication with each other using a suitable protocol for the communication depending on the implementation. The solution is however not limited to any specific types of messages, signals or protocols.

The wireless device 700 is arranged to manage reachability of the wireless device 700, when the wireless device 700 is in ECM_CONNECTED state and has an ECM connection between a network node 702 of a RAN (Radio Access Network) and a core node 704 associated with the RAN. The wireless device 700 comprises a state module 700A configured to handle states in the wireless device 700 as described herein. The wireless device 700 also comprises a timer module 700B configured to handle timers as described herein. The wireless device 700 further comprises a sending module 700C configured to send messages as described herein.

In more detail, the wireless device 700 is configured to start an AS (Access Stratum) reachable timer when entering an inactive state, which timer starting operation may be performed by the timer module 700B. The wireless device 700 is further configured to send to the network node 702 a reachable notification indicating that the wireless device 700 is reachable when detecting in the inactive state that the AS reachable timer expires. This sending operation may be performed by the sending module 700C. The wireless device 700 is further configured to alternatively stop the AS reachable timer when changing from the inactive state to a connected state before the AS reachable timer expires. This timer stopping operation may be performed by the timer module 700B.

The network node 702 belongs to a RAN and is arranged to manage reachability of a wireless device 700, when the wireless device 700 is in ECM_CONNECTED state and has an ECM connection between the network node 702 and a core node 704 associated with the RAN. The network node 702 comprises a detecting module 702A configured to detect states in the wireless device 700 as described herein. The network node 702 also comprises a timer module 702B configured to handle timers as described herein. The network node 702 further comprises a receiving/sending module 702C configured to receive and send messages as described herein. The network node 702 also comprises a connection module 702D configured to handle the ECM connection as described herein.

In more detail, the network node 702 is configured to detect that the wireless device 700 enters an inactive state, which detecting operation may be performed by the detecting module 702A. The network node 702 is also configured to start an AS reachable timer, which timer starting operation may be performed by the timer module 702B.

Depending on the situation, the network node 702 is configured to perform either of the following operations. Firstly, the network node 702 is configured to restart the AS reachable timer when receiving from the wireless device 700 a reachable notification indicating that the wireless device 700 is reachable. This timer restarting operation may be performed by the timer module 702B.

Secondly, the network node 702 is configured to stop the AS reachable timer when detecting that the wireless device 700 has changed from the inactive state to a connected state. This timer stopping operation may be performed by the timer module 702B. Thirdly, the network node 702 is configured to start an AS (Access Stratum) detach timer and disconnect the ECM connection between the network node 702 and the core node 704 when detecting that the AS detach timer expires. This timer starting operation and disconnecting operation may be performed by the timer module 702B and by the connection module 702D, respectively.

The core node 704 is associated with a RAN and arranged to manage reachability of a wireless device 700, when the wireless device 700 is in ECM_CONNECTED state and has an ECM connection between a network node 702 of the RAN and the core node 704. The core node 704 comprises a connection module 704A configured to handle the ECM connection as described herein. The core node 704 also comprises a timer module 704B configured to handle timers as described herein. The core node 704 further comprises a receiving module 704C configured to receive messages as described herein.

In more detail, the core node 704 is configured to receive from the network node 702 a not reachable notification indicating that the wireless device 700 is not reachable. This receiving operation may be performed by the receiving module 704C. Thereby, the wireless device 700 can be marked as not reachable via paging.

The wireless device 700, the network node 702 and the core node 704 are, e.g. by means of units, modules or the like, configured or arranged to perform at least some of the actions and steps of the above-described signaling diagrams, where appropriate.

It should be noted that FIG. 7 illustrates various functional modules in the wireless device 700, the network node 702 and the core node 704, respectively, and the skilled person is able to implement these functional modules in practice using suitable software and hardware equipment. Thus, the solution is generally not limited to the shown structures of the wireless device 700, the network node 702 and the core node 704, and the functional modules therein may be configured to operate according to any of the features, examples and embodiments described in this disclosure, where appropriate.

The functional modules 700A-C, 702A-C and 704A-C may be implemented in the wireless device 700, the network node 702 and the core node 704, respectively, by means of program modules of a respective computer program comprising code means which, when run by the processor P causes the wireless device 700, the network node 702 and the core node 704 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the wireless device 700, the network node 702 and the core node 704 in the form of a memory having a computer readable medium and being connected to the processor P. The computer program product or memory M in each of the wireless device 700, the network node 702 and the core node 704 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective wireless device 700, network node 702 and core node 704.

The solution described herein may be implemented in each of the wireless device 700, the network node 702 and the core node 704 by a computer program comprising instructions which, when executed on at least one processor, cause the at least one processor to carry out the actions according to any of the above embodiments and examples, where appropriate. The solution may also be implemented at each of the wireless device 700, the network node 702 and the core node 704 in a carrier containing the above computer program, wherein the carrier is one of an electronic signal, optical signal, radio signal, or computer readable storage medium.

Some further features and examples of how the above embodiments can be employed in practice will now be described with reference to three different communication cases illustrated by the signaling diagrams in FIGS. 8-10.

In the embodiments herein, a new dedicated AS timer for UE reachability management can be employed in the RAN and in the UE when RRC is Inactive. More specifically, the above-described two timers, referred to as "AS reachable timer" and "AS detach timer", may be employed. This way, an RRC notification procedure is basically introduced between UE and eNB so that the UE is able to update the RAN about its reachability.

- If RAN receives an RRC reachable signal from UE and if the signaling exchange between RAN and UE is successful (it is assumed that the UE receives confirmation of successful update from the RAN), the AS reachable timer will be reset both at RAN and UE. Eventually AS detach timer will be stopped.
- When AS reachable timer expires on RAN and the RAN did not receive any update signaling from the UE, RAN will notify CN to clear the PPF, i.e. notify the UE is currently not reachable via paging, and a AS detach timer will be started
- When AS detach timer expires on RAN. RAN will terminate the ECM connection and UP connection and notify CN for further actions.
- When AS reachable timer expires on UE and is within RAN coverage, it will initiate RRC reachable notification procedure.
- When AS reachable timer expires on UE and is out of RAN coverage or if a RRC reachable notification procedure is initiated and it is not successful, the UE will initiate RRC reachable notification procedure as soon as it is within RAN coverage, By employing at least some of the above embodiments, the network is able to determine the UE availability when the UE is in inactive state.

The three signalling diagrams in FIGS. 8-10 will now be described to illustrate the handling of three different situations A-C. These situations represent the following:

A: Normal case, where the UE enters inactive state and starts its periodic timer, and the UE can successfully transmit a reachability response to the network after the periodic timer timeout occurs.

B: RRC in connected state before timeout, where the UE enters inactive state and starts its periodic timer, but re-enters active state before periodic timer timeout occurs.

C: UE not reachable and periodic timeout occurs, where the UE enters inactive state and starts its periodic timer, and the UE cannot transmit a reachability response to the network after the periodic timeout occurs.

Throughout the following examples, the above-described ECM connection between the network node and the core node is referred to as "the S1 connection" for short.

Figure 8:
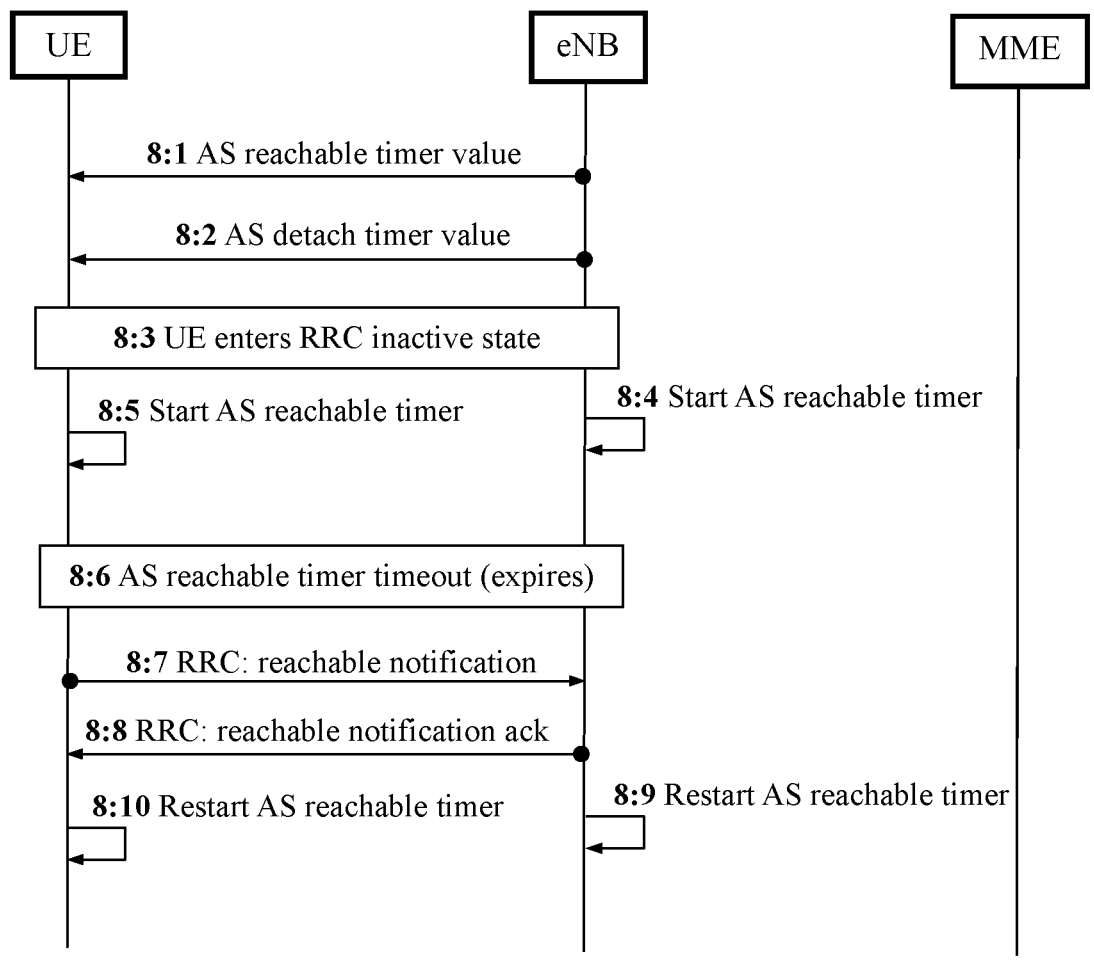
FIG. 8 is a signaling diagram illustrating an example of a procedure when the solution is used, according to further example embodiments.

FIG. 8 is a signalling diagram for situation A, "normal case". In this example, the following actions are performed:

Action 8:1. A new AS reachable timer value is transferred from e(g)NB to UE prior UE enters RRC inactive state. This value can either be transferred by a new dedicated message or as a new IE on existing messages through RRC.

Action 8:2. A new AS detach timer value is transferred from e(g)NB to UE prior UE enters RRC inactive state. This value can either be transferred by a new dedicated message or as a new IE on existing messages through RRC.

Action 8:3. UE enters RRC inactive state due to inactivity on user plane. The RRC connection between eNB and UE will be released, but the S1 connection between eNB and MME will still be kept.

Action 8:4. e(g)NB starts a new AS reachable timer for the UE after the UE enters RRC inactive state.

Action 8:5. UE starts a new AS reachable timer after its RRC state changes to inactive.

Action 8:6. The AS reachable timer timeout occurs on UE.

Action 8:7. UE transmits a new RRC signal, reachable notification, notifying e(g)NB its reachability.

Action 8:8. e(g)NB responses UE's reachable notification with a new acknowledgement signal through RRC.

Action 8:9. e(g)NB restarts the AS reachable timer for the UE after reception of RRC signal "reachable notification" from UE.

Action 8:10. UE restarts the AS reachable timer for the UE after reception of RRC signal "reachable notification acknowledgement" from e(g)NB.

Figure 9:
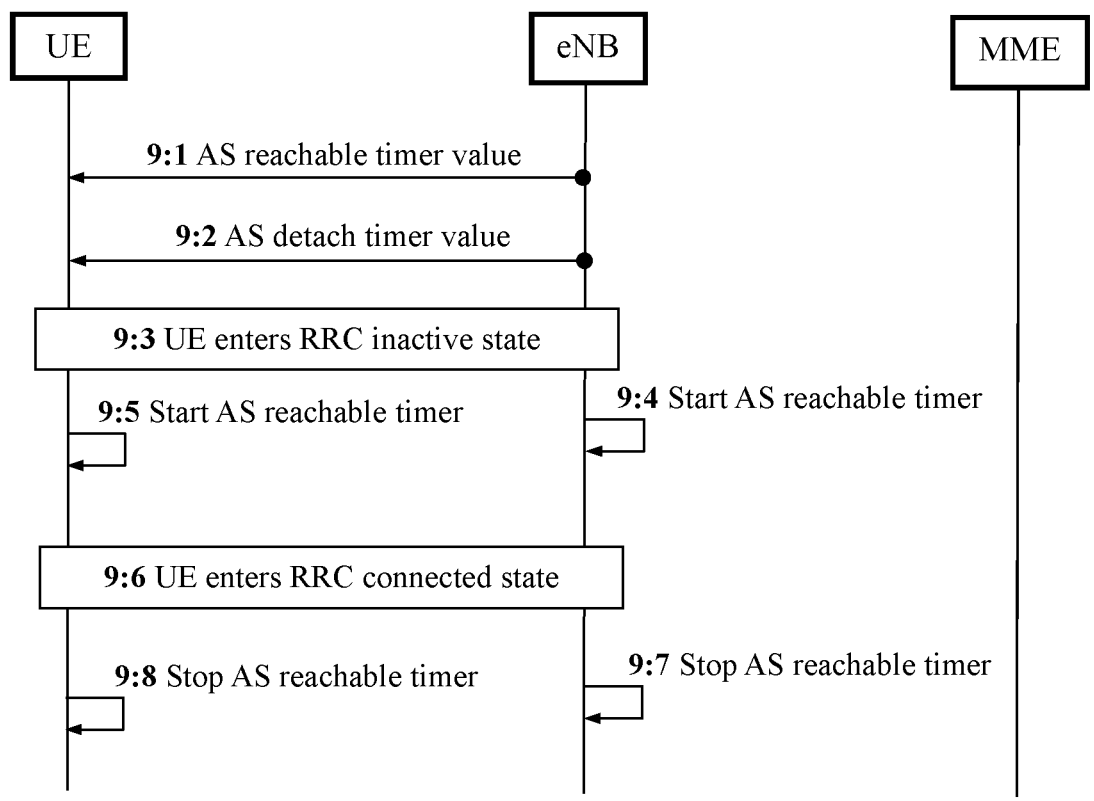
FIG. 9 is a signaling diagram illustrating another example of a procedure when the solution is used, according to further example embodiments.

FIG. 9 is a Sequence diagram for situation B, "RRC in connected state before timeout", where the UE thus enters RRC connected state before timeout of the AS reachable timer. In this example, the following actions are performed:

Action 9:1. A new AS reachable timer value is transferred from e(g)NB to UE prior UE enters RRC inactive state. This value can either be transferred by a new dedicated message or as a new IE on existing messages through RRC.

Action 9:2. A new AS detach timer value is transferred from e(g)NB to UE prior UE enters RRC inactive state. This value can either be transferred by a new dedicated message or as a new IE on existing messages through RRC.

Action 9:3. UE enters RRC inactive state due to inactivity on user plane. The RRC connection between eNB and UE will be released, but the S1 connection between eNB and MME will still be kept.

Action 9:4. e(g)NB starts a new AS reachable timer for the UE after the UE enters RRC inactive state.

Action 9:5. UE starts a new AS reachable timer after its RRC state changes to inactive.

Action 9:6. UE changes its RRC state from inactive to connected, due to e.g. data activity on the user plane.

Action 9:7. e(g)NB stops the AS reachable timer for the UE after the UE's RRC state changes to connected.

Action 9:8. UE stops the AS reachable timer after its RRC state has been changed to connected.

Figure 10:
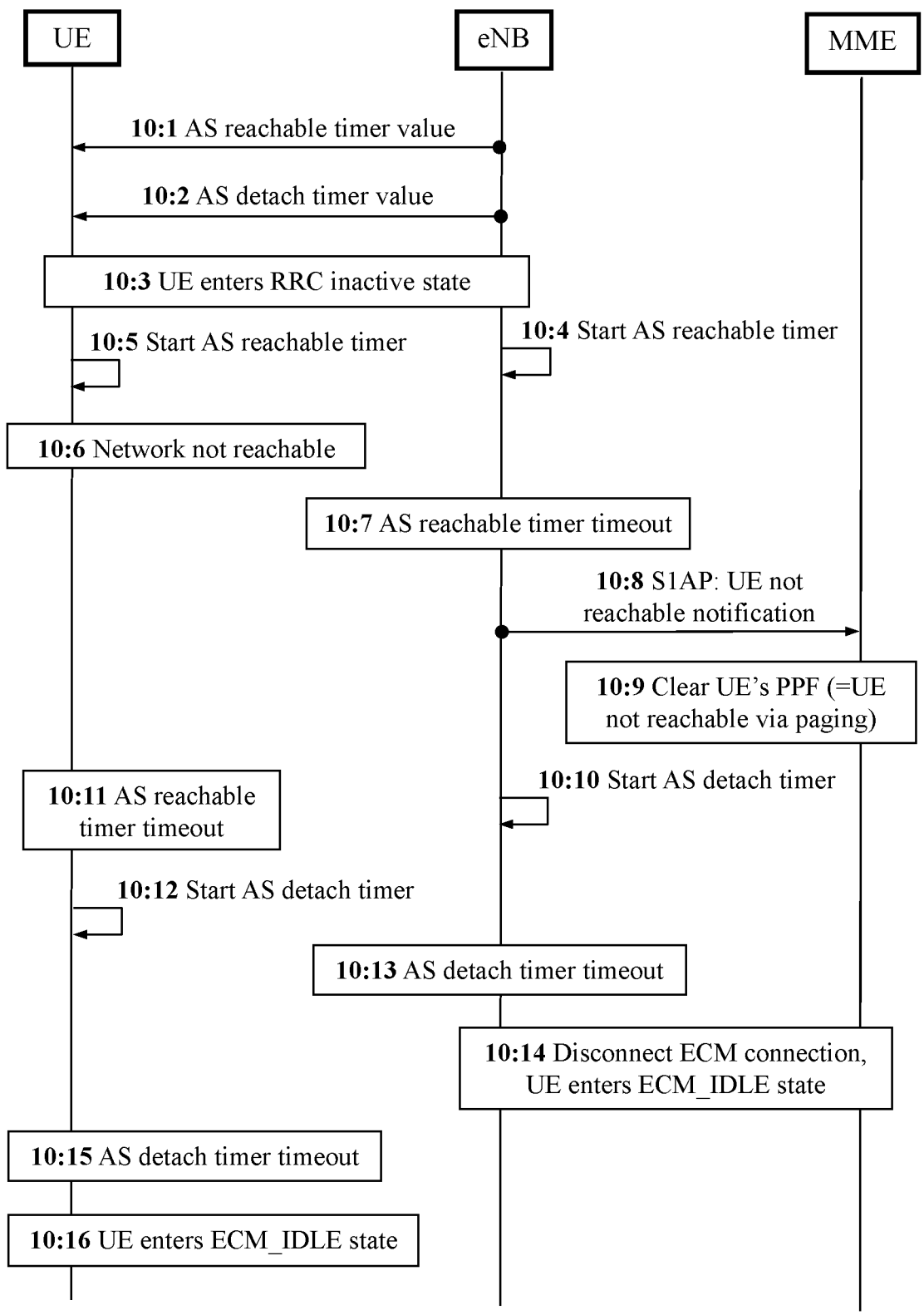
FIG. 10 is a signaling diagram illustrating another example of a procedure when the solution is used, according to further example embodiments.

FIG. 10 is a Sequence diagram for situation C, "UE not reachable and periodic timeout occurs", where the UE is thus not reachable when the timeout of the AS reachable timer occurs. In this example, the following actions are performed:

Action 10:1. A new AS reachable timer value is transferred from e(g)NB to UE prior UE enters RRC inactive state. This value can either be transferred by a new dedicated message or as a new IE on existing messages through RRC.

Action 10:2. A new AS detach timer value is transferred from e(g)NB to UE prior UE enters RRC inactive state. This value can either be transferred by a new dedicated message or as a new IE on existing messages through RRC.

Action 10:3. UE enters RRC inactive state due to inactivity on user plane. The RRC connection between eNB and UE will be released, but the S1 connection between eNB and MME will still be kept.

Action 10:4. e(g)NB starts a new AS reachable timer for the UE after the UE enters RRC inactive state.

Action 10:5. UE starts a new AS reachable timer after its RRC state changes to inactive.

Action 10:6. Network is not reachable from UE and it cannot notify e(g)NB its reachability.

Action 10:7. The AS reachable timer for the UE gets timeout on e(g)NB.

Action 10:8. e(g)NB notifies MME that the UE is unreachable through a new S1AP procedure. The S1 connection for the UE is kept.

Action 10:9. MME marks the UE as unreachable, i.e. no paging will be performed on the UE if DL data for the UE arrives to the core network.

Action 10:10. e(g)NB starts a new AS detach timer for the UE after AS reachable timer timeout for the UE occurs.

Action 10:11. The AS reachable timer timeout occurs on UE.

Action 10:12. As UE cannot reach the network and AS reachable timer timeout occurs, UE starts a new AS detach timer.

Action 10:13. The AS detach timer for the UE gets timeout on e(g)NB.

Action 10:14. e(g)NB initiates S1 disconnection between core network and e(g)NB for the UE, and set the connection between UE and network to ECM_IDLE. After this point the UE reachability procedure is taken over by the MME/Core network.

Action 10:15. The AS detach timer timeout occurs on UE

Action 10:16. UE will change its ECM state to ECM_IDLE.

While the solution has been described with reference to specific exemplifying embodiments, the description is generally only intended to illustrate the inventive concept and should not be taken as limiting the scope of the solution. For example, the terms "network node", "wireless device", "core node", "ECM connection", "NAS periodic timer", "AS reachable timer", and "AS detach timer" have been used throughout this disclosure, although any other corresponding entities, functions, and/or parameters could also be used having the features and characteristics described here. The solution may be implemented according to the appended claims.

The invention claimed is:

1. A method performed by a wireless device for managing reachability of the wireless device, the method comprising:
    being in ECM CONNECTED state and having an ECM (EPS (Evolved Packet System) Connection Management) connection between a network node of a RAN (Radio Access Network) and a core node associated with the RAN,
    entering from the ECM_CONNECTED state into an inactive state in which an RRC (Radio Resource Control) connection between the wireless device and the network node of the RAN is suspended while the ECM connection is kept and starting an AS (Access Stratum) reachable timer when entering the inactive state, and
    in response to detecting in the inactive state that the AS reachable timer expires, sending to the network node a reachable notification indicating that the wireless device is reachable, and
    in response to changing from the inactive state to a connected state before the AS reachable timer expires, stopping the AS reachable timer.

2. A method according to claim 1, wherein a value of the AS reachable timer is received from the network node.

3. A method according to claim 1, wherein the AS reachable timer is restarted in the wireless device after sending said reachable notification to the network node and receiving a reachable notification acknowledgement from the network node, or when changing from the connected state to the inactive state.

4. A method according to claim 1, the method further comprising:
   starting an AS (Access Stratum) detach timer when detecting that the RAN is not reachable and the AS reachable timer expires, and
   changing from the inactive state to ECM_IDLE state when detecting that the AS detach timer expires.

5. A method according to claim 4, wherein a value of the AS detach timer is received from the network node.

6. The method according to claim 1, wherein the wireless device enters the inactive state due to inactivity on a user plane and the RRC (Radio Resource Control) connection between the wireless device and the network node is released but the ECM connection between the network node and the core node is maintained for the wireless device.

7. The method according to claim 1, wherein the wireless device refrains from making any Tracking Area Update while being in the inactive state.

8. The method according to claim 1, wherein the wireless device when in the inactive state keeps a resume ID and that may be used for resuming the RRC (Radio Resource Control) connection.

9. A method performed by a network node of a RAN (Radio Access Network), for managing reachability of a wireless device, the method comprising:
   detecting that the wireless device, the wireless device being in ECM CONNECTED state and having an ECM (EPS (Evolved Packet System) Connection Management) connection between the network node and a core node associated with the RAN, enters from the ECM_CONNECTED state into an inactive state and then suspending an RRC (Radio Resource Control) connection with the wireless device while keeping the ECM connection,
   starting an AS (Access Stratum) reachable timer, and
   in response to receiving from the wireless device a reachable notification indicating that the wireless device is reachable, restarting the AS reachable timer, and
   in response to detecting that the wireless device has changed from the inactive state to a connected state, stopping the AS reachable timer, and
   in response to detecting that the AS detach timer expires, starting an AS (Access Stratum) detach timer and disconnecting the ECM connection between the network node and the core node.

10. A wireless device for managing reachability of the wireless device wherein the wireless device is configured to:
   be in ECM CONNECTED state and have an ECM (EPS (Evolved Packet System) Connection Management) connection between a network node of a RAN (Radio Access Network) and a core node associated with the RAN,
   enter from the ECM_CONNECTED state into an inactive state in which an RRC (Radio Resource Control) connection between the wireless device and the network node is suspended while the ECM connection is kept, and start an AS (Access Stratum) reachable timer when entering the inactive state, and
   in response to detecting in the inactive state that the AS reachable timer expires, send to the network node a reachable notification indicating that the wireless device is reachable, and
   in response to changing from the inactive state to a connected state before the AS reachable timer expires, stop the AS reachable timer.

11. A wireless device according to claim 10, wherein the wireless device is configured to receive a value of the AS reachable timer from the network node.

12. A wireless device according to claim 10, wherein the wireless device is configured to restart the AS reachable timer in the wireless device after sending said reachable notification to the network node and receiving a reachable notification acknowledgement from the network node, or when changing from the connected state to the inactive state.

13. A wireless device according to claim 10, wherein the wireless device is further configured to:
   start an AS (Access Stratum) detach timer when detecting that the RAN is not reachable and the AS reachable timer expires, and
   change from the inactive state to ECM_IDLE state when detecting that the AS detach timer expires.

14. A wireless device according to claim 13, wherein a value of the AS detach timer is received from the network node.

15. The method according to claim 10, wherein the wireless device enters the inactive state due to inactivity on a user plane and the RRC (Radio Resource Control) connection between the wireless device and the network node is released but the ECM connection between the network node and the core node is maintained for the wireless device.

16. The method according to claim 10, wherein the wireless device refrains from making any Tracking Area Update while being in the inactive state.

17. The method according to claim 10, wherein the wireless device when in the inactive state keeps a resume ID and that may be used for resuming the RRC (Radio Resource Control) connection.

18. A network node of a RAN (Radio Access Network), for managing reachability of a wireless device, wherein the network node is configured to:
   detect that the wireless device, the wireless device being in ECM CONNECTED state and having an ECM (EPS (Evolved Packet System) Connection Management) connection between the network node and a core node associated with the RAN, enters from the ECM CONNECTED state into an inactive state and then suspend an RRC (Radio Resource Control) connection with the wireless device while keeping the ECM connection,
   start an AS (Access Stratum) reachable timer, and
   in response to receiving from the wireless device a reachable notification indicating that the wireless device is reachable, restart the AS reachable timer, and
   in response to detecting that the wireless device has changed from the inactive state to a connected state, stop the AS reachable timer, and
   in response to detecting that the AS detach timer expires, start an AS (Access Stratum) detach timer and disconnecting the ECM connection between the network node and the core node.

19. A computer program on a non-transitory computer readable medium comprising instructions which, when executed on at least one processor, cause the at least one processor to carry out the method according to claim 1.

* * * * *